US012215612B2

(12) United States Patent
Venkatesha et al.

(10) Patent No.: US 12,215,612 B2
(45) Date of Patent: Feb. 4, 2025

(54) SYSTEM AND METHOD FOR A CAB-MOUNTED MUFFLER ASSEMBLY

(71) Applicant: Transportation IP Holdings, LLC, Norwalk, CT (US)

(72) Inventors: Sandeep Kanzal Venkatesha, Bengaluru (IN); Samir Vikas Joshi, Bengaluru (IN); Mohammed Sajid Ahmed, Bengaluru (IN); Sudeer Gowd Patil, Bengaluru (IN); Abhijit Eknath Patil, Bengaluru (IN); Kavitha Gajanan, Bengaluru (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 542 days.

(21) Appl. No.: 17/452,745

(22) Filed: Oct. 28, 2021

(65) Prior Publication Data

US 2022/0178298 A1 Jun. 9, 2022

Related U.S. Application Data

(60) Provisional application No. 63/121,183, filed on Dec. 3, 2020.

(51) Int. Cl.

| | |
|---|---|
| ***F01N 13/18*** | (2010.01) |
| ***B61C 5/04*** | (2006.01) |
| ***F01N 1/06*** | (2006.01) |
| ***F01N 3/08*** | (2006.01) |
| ***G10K 11/16*** | (2006.01) |

(52) U.S. Cl.

CPC ............ *F01N 13/1805* (2013.01); *B61C 5/04* (2013.01); *F01N 1/06* (2013.01); *F01N 3/0892* (2013.01); *G10K 11/161* (2013.01)

(58) Field of Classification Search

CPC ...... F01N 13/1805; F01N 1/06; F01N 3/0892; B61C 5/04; G10K 11/161

See application file for complete search history.

(56) References Cited

U.S. PATENT DOCUMENTS

| | | | | |
|---|---|---|---|---|
| 2,667,843 A * | 2/1954 | Dean | B61C 5/02 | 60/272 |
| 2,719,489 A * | 10/1955 | Dean | B61C 5/04 | 105/49 |
| 2,784,549 A * | 3/1957 | Henney | F02B 73/00 | 237/19 |
| 6,681,879 B2 * | 1/2004 | Iannarelli | F01N 13/1805 | 180/309 |

(Continued)

FOREIGN PATENT DOCUMENTS

| | | | |
|---|---|---|---|
| CN | 115447619 A * | 12/2022 | |
| WO | WO-2014032783 A1 * | 3/2014 | F01N 13/107 |
| WO | WO-2014184860 A1 * | 11/2014 | B60K 13/04 |

*Primary Examiner* — Jacob B Meyer

(74) *Attorney, Agent, or Firm* — K&L Gates LLP

(57) ABSTRACT

Systems and methods for a cab-mounted muffler assembly are provided. In one embodiment, a system includes a support structure configured to couple to an engine cab within an interior of the engine cab; and a muffler assembly configured to mount to the support structure within the interior and spaced apart from an engine by the support structure. The muffler assembly is mounted to the support structure vertically above the engine relative to a ground surface on which the engine cab is supported.

20 Claims, 11 Drawing Sheets

(56) References Cited

U.S. PATENT DOCUMENTS

| | | | | | |
|---|---|---|---|---|---|
| 6,983,728 | B1 * | 1/2006 | Banks, Jr. | F01N 13/16 | 60/322 |
| 7,685,943 | B2 * | 3/2010 | Caro | B61C 5/04 | 454/166 |
| 8,141,535 | B2 * | 3/2012 | Olsen | F01N 13/1822 | 123/195 A |
| 8,167,067 | B2 * | 5/2012 | Peterson | F01N 3/055 | 180/68.2 |
| 8,191,668 | B2 * | 6/2012 | Keane | F01N 13/1822 | 180/309 |
| 8,495,960 | B2 * | 7/2013 | Willbrandt | F02B 77/13 | 105/62.1 |
| 8,596,049 | B2 * | 12/2013 | Isada | F01N 13/04 | 60/324 |
| 8,769,941 | B2 * | 7/2014 | Svihla | F01N 13/1855 | 60/299 |
| 8,793,982 | B2 * | 8/2014 | Patel | F01N 9/002 | 60/303 |
| 9,157,214 | B2 * | 10/2015 | Tsumura | B60K 13/04 | |
| 9,200,550 | B2 * | 12/2015 | Mori | F01N 3/2882 | |
| 9,238,901 | B2 * | 1/2016 | Kamimae | F01N 13/1855 | |
| 9,316,136 | B2 * | 4/2016 | Kobayashi | F01N 13/1805 | |
| 9,441,514 | B2 * | 9/2016 | Tanaka | F01N 3/021 | |
| 9,441,527 | B2 * | 9/2016 | Kamimae | E02F 9/0833 | |
| 9,453,326 | B2 * | 9/2016 | Shimohira | B60K 13/04 | |
| 9,494,083 | B2 * | 11/2016 | Plummer | F01N 3/021 | |
| 9,506,388 | B2 * | 11/2016 | Flynn | F01N 13/017 | |
| 9,506,597 | B2 * | 11/2016 | Arner | F16M 7/00 | |
| 9,556,586 | B2 * | 1/2017 | Ohmura | B60K 11/02 | |
| 9,598,091 | B2 * | 3/2017 | Svihla | B01D 39/00 | |
| 9,670,646 | B2 * | 6/2017 | Ohmura | E02F 9/0866 | |
| 9,810,133 | B2 * | 11/2017 | Sandou | F01N 13/18 | |
| 9,856,996 | B2 * | 1/2018 | Ozaki | F01N 13/1816 | |
| 9,944,168 | B2 * | 4/2018 | Kurokawa | F01N 13/0097 | |
| 9,995,198 | B2 * | 6/2018 | Sandou | F01N 3/021 | |
| 10,100,721 | B2 * | 10/2018 | Tiwari | F01N 13/1805 | |
| 10,125,648 | B2 * | 11/2018 | Flynn | F02B 37/00 | |
| 10,221,756 | B2 * | 3/2019 | Music | F02B 37/00 | |
| 10,287,950 | B2 * | 5/2019 | Patel | F01N 3/24 | |
| 10,895,199 | B2 * | 1/2021 | Sondur | F02B 63/042 | |
| 10,919,412 | B2 * | 2/2021 | Sondur | B61C 7/04 | |
| 10,947,889 | B2 * | 3/2021 | Tandon | F01N 13/1805 | |
| 11,173,928 | B2 * | 11/2021 | Diedrichs | F01P 3/18 | |
| 11,187,128 | B2 * | 11/2021 | Patel | F01N 3/28 | |
| 11,629,621 | B2 * | 4/2023 | Patil | F01N 3/06 | 181/228 |
| 12,000,362 | B2 * | 6/2024 | Kasazaki | F02M 26/10 | |
| 2009/0044531 | A1 * | 2/2009 | Lu | F01N 3/0222 | 60/299 |
| 2010/0186394 | A1 * | 7/2010 | Harrison | F01N 13/18 | 60/299 |
| 2014/0261286 | A1 * | 9/2014 | Madera | F01N 13/1805 | 29/888.01 |
| 2016/0090902 | A1 * | 3/2016 | Svihla | F02B 37/007 | 60/599 |
| 2016/0288639 | A1 * | 10/2016 | Kikuchi | F01N 13/1855 | |
| 2022/0178298 | A1 * | 6/2022 | Venkatesha | F01N 13/1805 | |
| 2022/0325652 | A1 * | 10/2022 | Soden | F01N 13/16 | |

* cited by examiner

SYSTEM AND METHOD FOR A CAB-MOUNTED MUFFLER ASSEMBLY

CROSS REFERENCE TO RELATED APPLICATIONS

The present application claims priority to U.S. Provisional Application No. 63/121,183, entitled "SYSTEMS AND METHODS FOR A CAB-MOUNTED MUFFLER ASSEMBLY," and filed on Dec. 3, 2020. The entire contents of the above-listed application are hereby incorporated by reference for all purposes.

BACKGROUND

Technical Field

Embodiments of the subject matter disclosed herein relate to a cab-mounted muffler assembly.

Discussion of Art

Some vehicles have engine systems that may include a muffler. The muffler may reduce an amount of perceived noise generated by an engine. The muffler may be mounted to the engine and may have a relatively small size in order to accommodate coupling of other components to the engine, such as one or more turbochargers. The muffler may receive exhaust gases from the engine and may reduce an amount of sound associated with the output of the exhaust gases from the engine. However, as a number of components mounted to the engine increases, an amount of space surrounding the engine for servicing and/or maintenance of the components may decrease. It may be desirable to have a muffler and/or engine system that differs from those that are currently available.

BRIEF DESCRIPTION OF THE FIGURES

FIGS. 2-20 are shown to scale, although other relative dimensions may be used, if desired.

DETAILED DESCRIPTION

Figure 5:
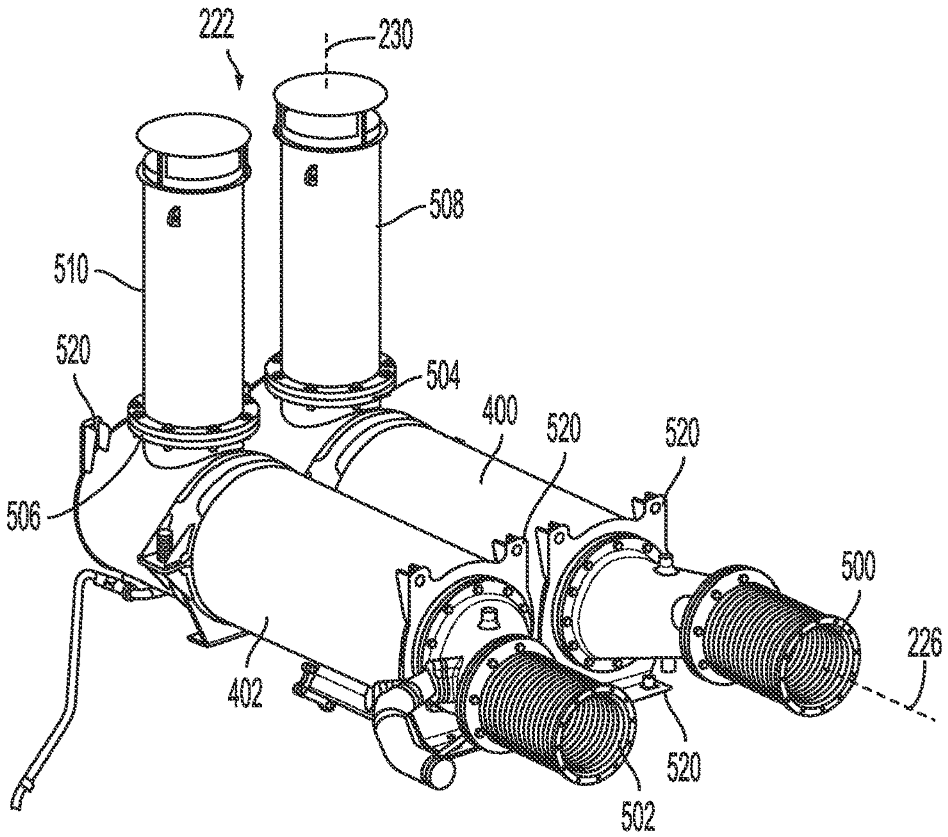
FIG. 5 shows a perspective view of a cab-mounted muffler assembly.
Figure 6:
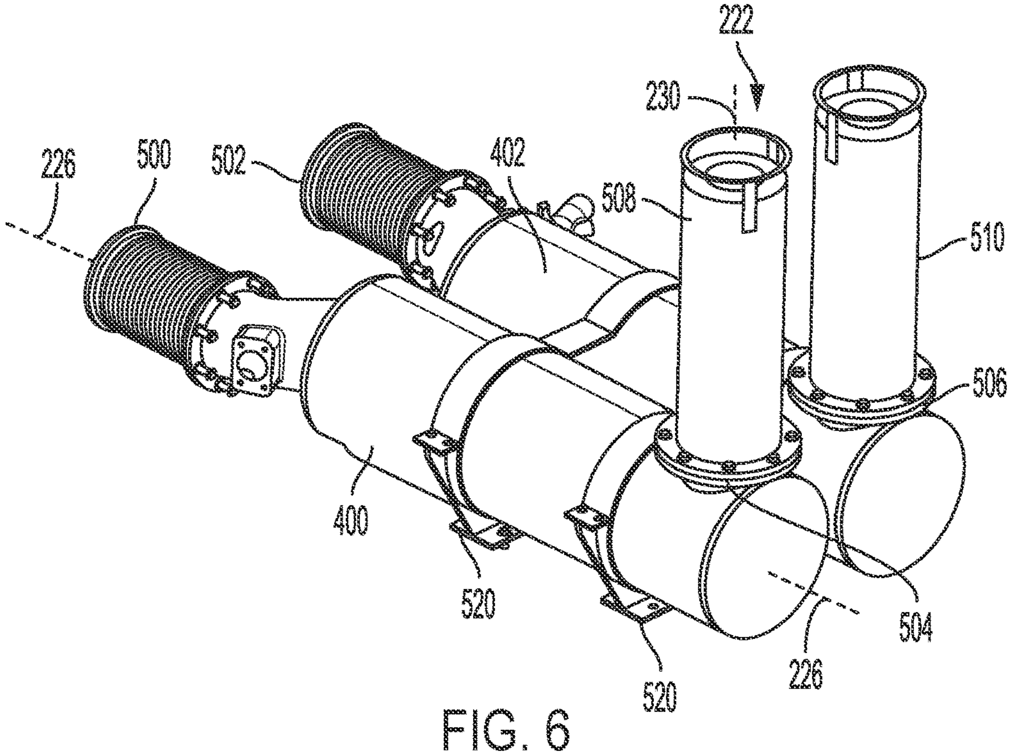
FIG. 6 shows another perspective view of the cab-mounted muffler assembly of FIG. 5.
Figure 11:
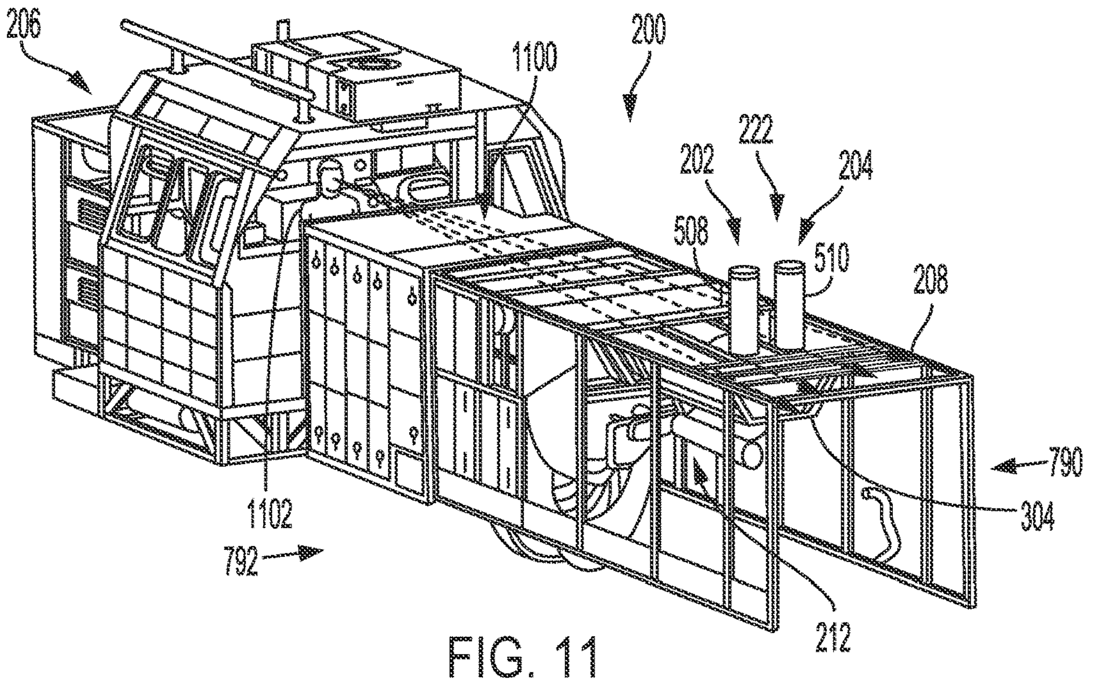
FIG. 11 shows a partial perspective view of the cab-mounted muffler assembly of FIGS. 5-6 mounted to the support structure of FIGS. 7-8 in the locomotive of FIG. 2.
Figure 12:
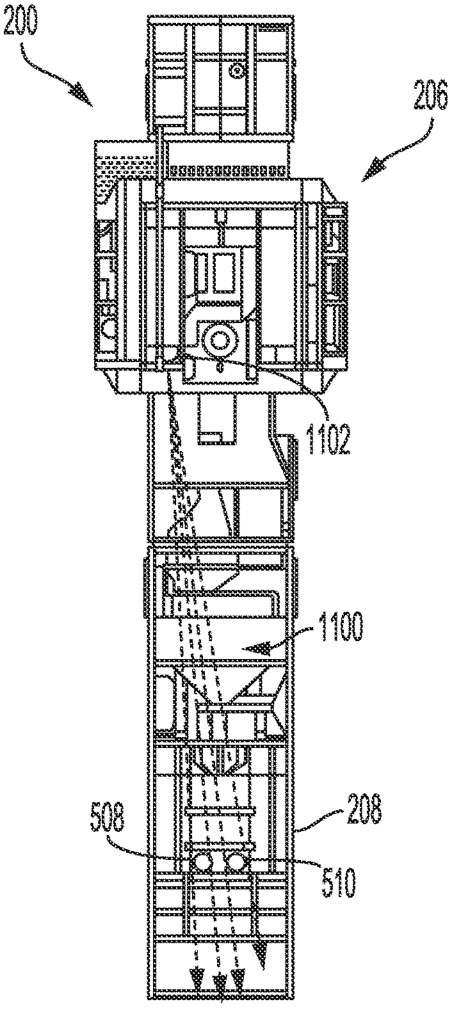
FIG. 12 shows a top view of the locomotive.
Figure 13:
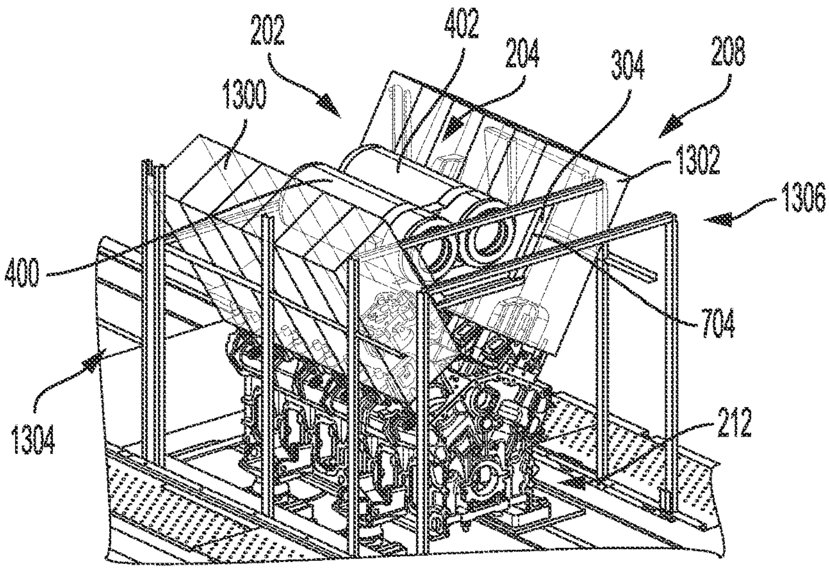
FIG. 13 shows a perspective view an engine arranged below the cab-mounted muffler assembly of FIGS. 5-6 mounted to the support structure of FIGS. 7-8.
Figure 14:
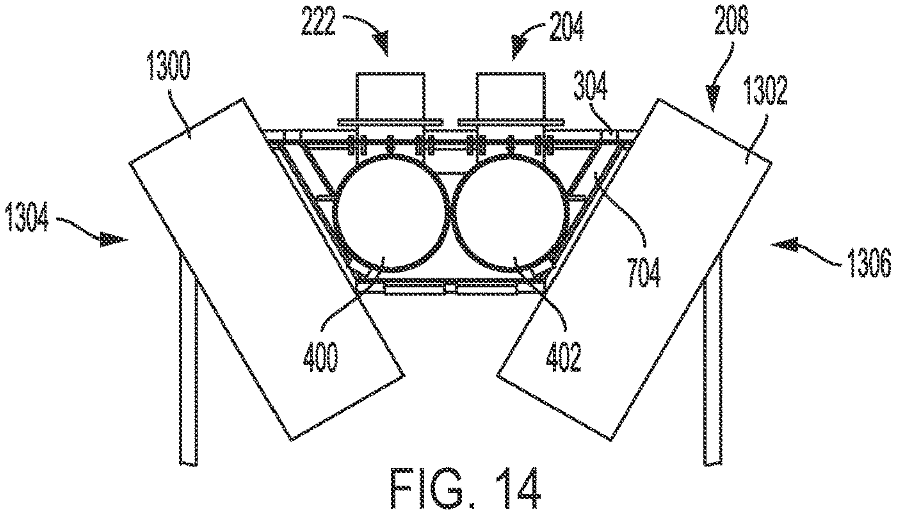
FIG. 14 shows a front view of the cab-mounted muffler assembly and support structure of FIG. 13.
Figure 15:
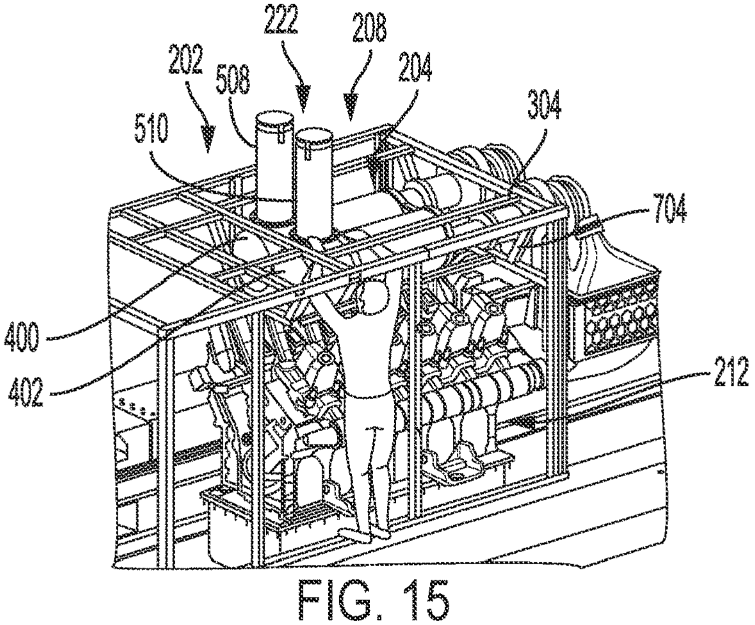
FIG. 15 shows a perspective view of the engine, cab-mounted muffler assembly, and support structure of FIG. 13 with an operator.
Figure 16:
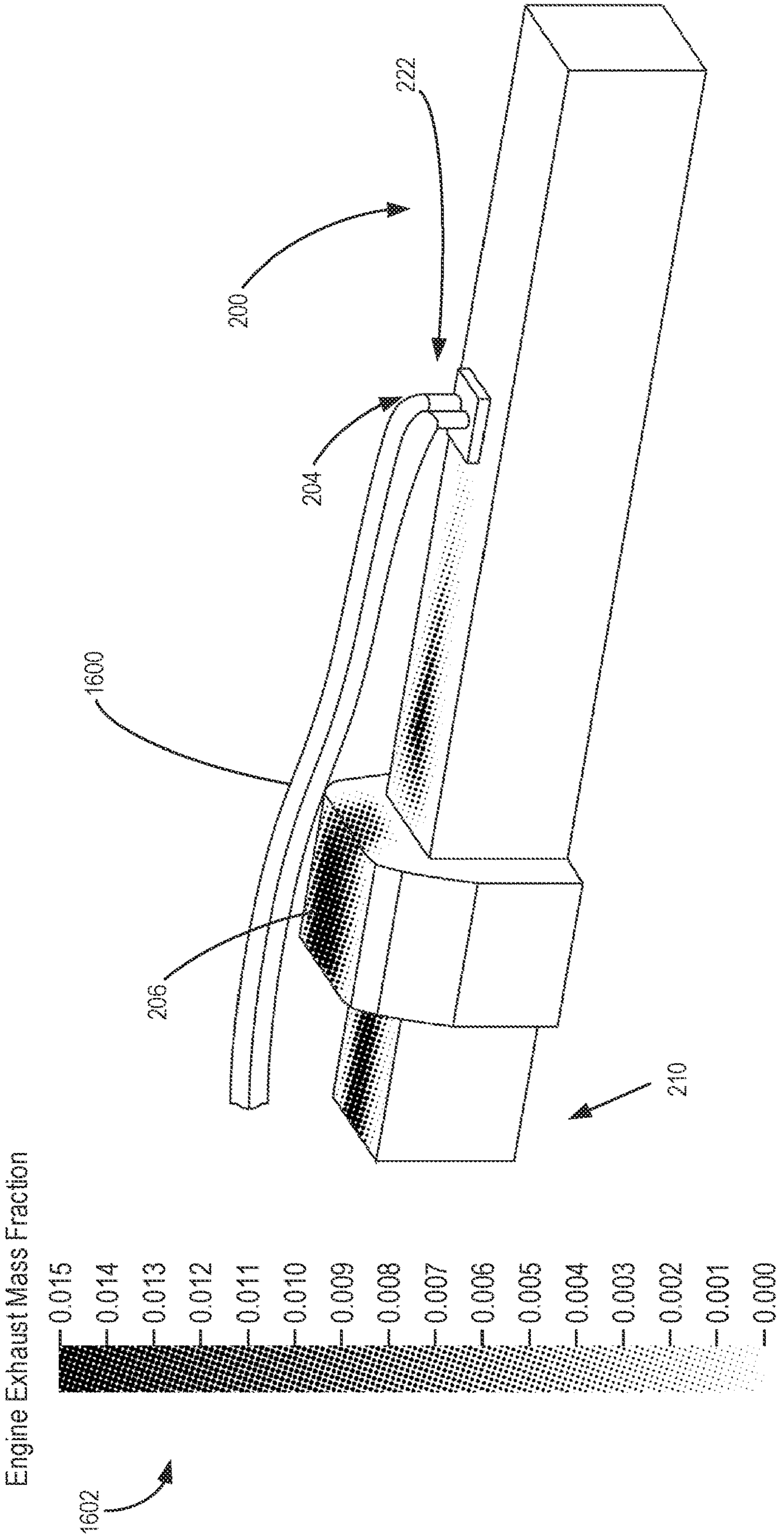
FIG. 16 schematically shows an exhaust path of the locomotive of FIG. 2 during a first operating condition.
Figure 17:
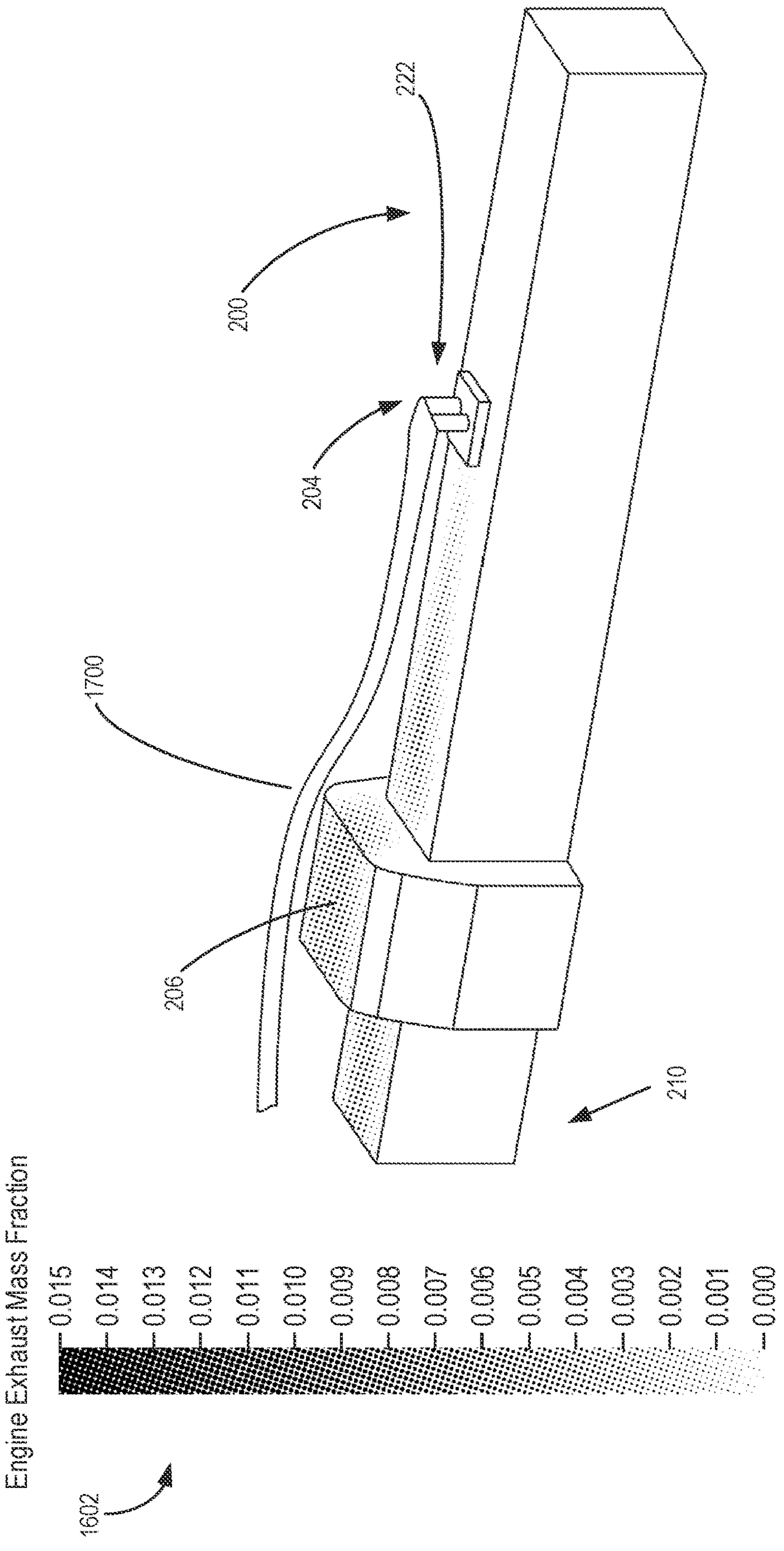
FIG. 17 schematically shows an exhaust path of the locomotive of FIG. 2 during a second operating condition.
Figure 18:
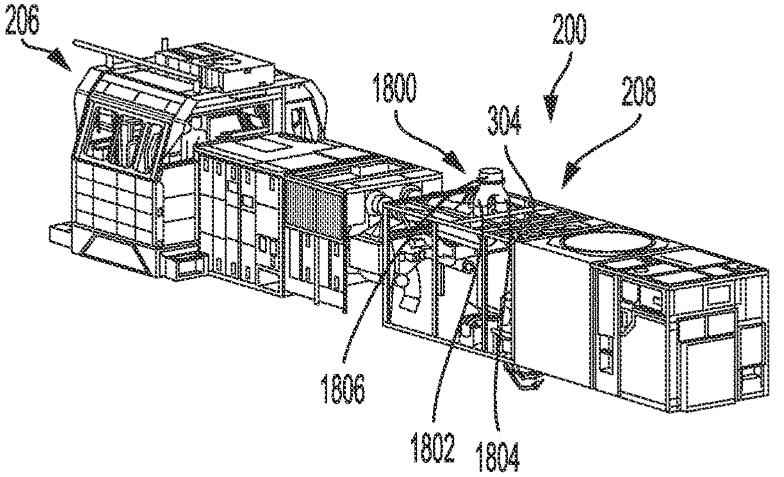
FIG. 18 shows a perspective view of another locomotive including a cab-mounted muffler assembly.
Figure 19:
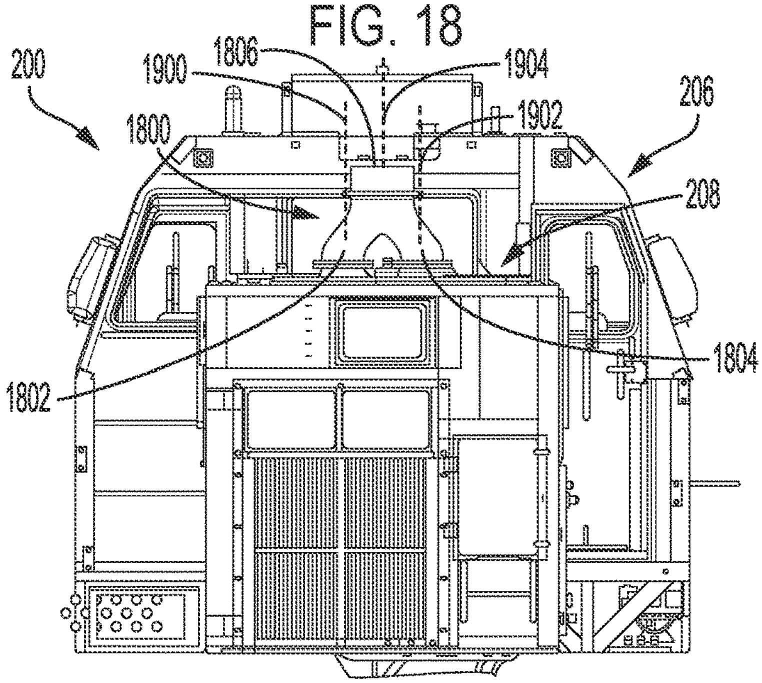
FIG. 19 shows a front view of the locomotive of FIG. 18.
Figure 20:
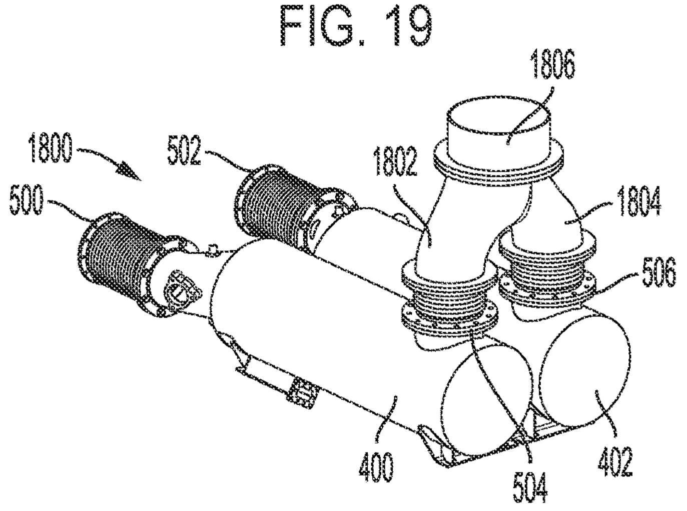
FIG. 20 shows the cab-mounted muffler assembly of FIG. 18.

The following description relates to embodiments of a system for a cab-mounted muffler assembly. An engine system, such as the engine system shown by FIG. 1, may include an engine housed in an engine cab, such as the engine cab shown by FIGS. 2-4. A cab-mounted muffler assembly, such as the assembly shown by FIGS. 5-6, is directly mounted to a support structure of the engine cab, such as the support structure shown by FIGS. 7-10. The cab-mounted muffler assembly may mount directly to the support structure in an arrangement vertically above the engine such that an amount of space surrounding the engine and cab-mounted muffler assembly is increased for ease of maintenance and/or servicing, as shown by FIGS. 13-15. The arrangement of the cab-mounted muffler assembly directly coupled to the support structure may increase a visibility from an operator cab of a vehicle including the engine system, as shown by FIGS. 11-12. Further, the arrangement of the cab-mounted muffler assembly directly coupled to the support structure may reduce an amount of exhaust flowing in a direction of the operator cab from an exhaust stack coupled to the muffler assembly, as shown by FIGS. 16-17. In some examples, the muffler assembly may include outlet passages that bend and/or join together to a single passage, as shown by FIGS. 18-20. By coupling the muffler assembly directly to the support structure of the engine cab, a vibration and/or temperature of the muffler assembly may be reduced, and an ease of operation and/or maintenance of the engine system may be increased. The engine system may be a vehicle engine system.

Figure 1:
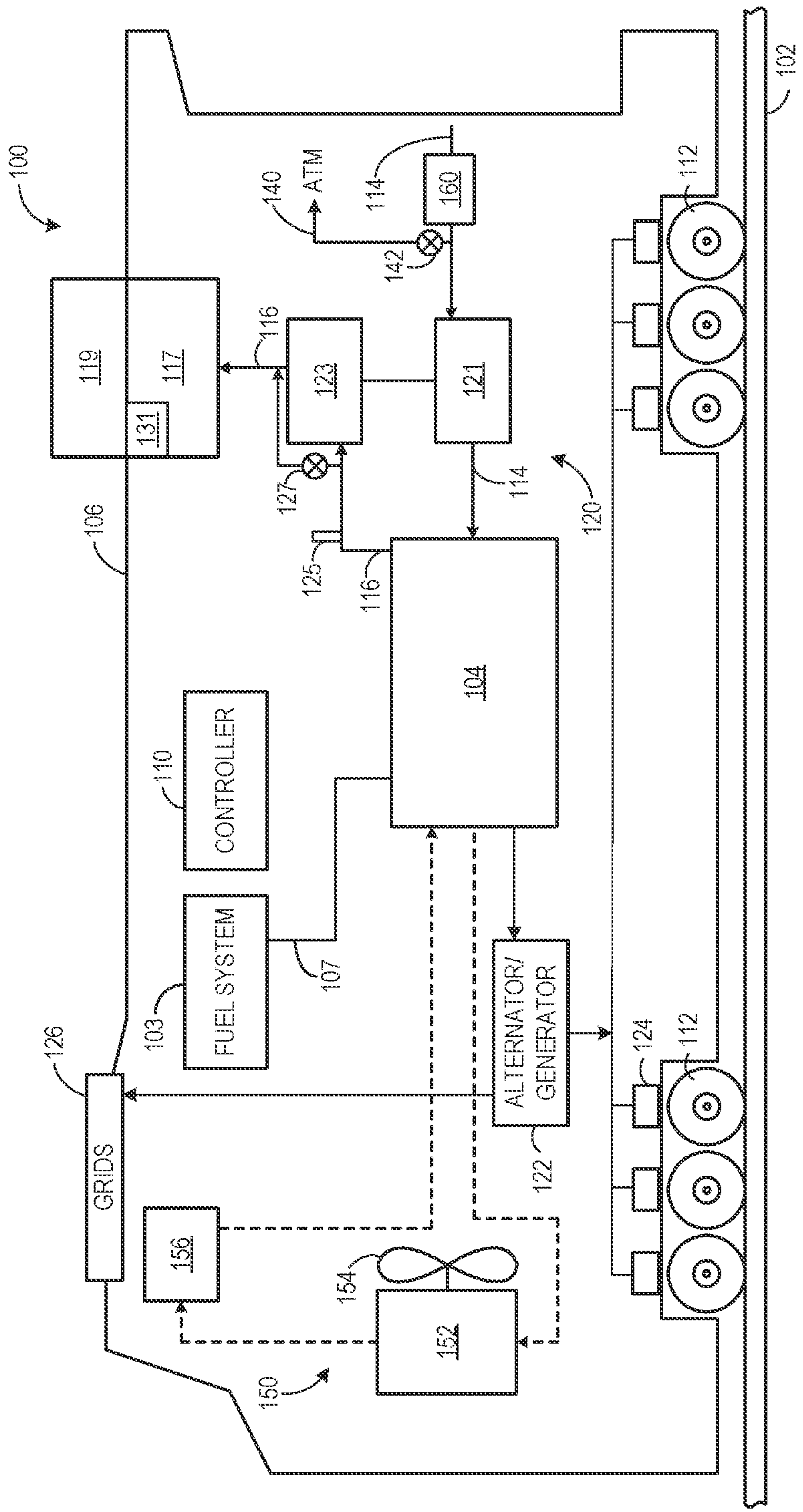
FIG. 1 shows a schematic diagram of a vehicle including an engine and a cab-mounted muffler assembly, according to an embodiment of the invention.

Referring to FIG. 1, a block diagram of an embodiment of a vehicle system 100 (e.g., engine system) is shown, herein depicted as a rail vehicle 106 in the illustrated embodiment. The rail system can run on a rail 102 via a plurality of wheels 112. As depicted, the rail vehicle may include an engine 104, and the engine may include a plurality of combustion chambers (e.g., cylinders). The cylinders of the engine are configured to receive fuel (e.g., diesel fuel) from a fuel system 103 via a fuel conduit 107. In some examples, the fuel conduit may be coupled with a common fuel rail and a plurality of fuel injectors. While a rail vehicle is illustrated for convenience, a suitable vehicle may be a vehicle equipped for mining, marine, agriculture, industrial construction, on-road transport and other like applications.

The engine receives intake air for combustion from an intake passage 114. The intake air may include ambient air from outside of the vehicle flowing into the intake passage through an air filter 160. The intake passage may include and/or be coupled to an intake manifold of the engine. Exhaust gas resulting from combustion in the engine is supplied to an exhaust passage 116. Exhaust gas flows through the exhaust passage, to a muffler 117, and out of an exhaust stack 119 of the rail vehicle. The muffler may have a cab-mounted muffler adapted to couple to a support structure of an engine cab of the engine system, similar to the embodiments described below with reference to FIGS. 2-20. The support structure may be supported entirely by the engine cab. Further, the muffler may include at least one spark arrestor 131 configured to reduce an amount of particulates flowing from the exhaust stack. The cab-mounted muffler assembly may be referred to herein as an exhaust management system. Each spark arrestor included by the muffler may be referred to herein as an integrated spark arrestor.

In one example, the engine is a multi-fuel engine that combusts air and two or more fuels through compression ignition. For example, the engine may combust two or more fuels. Suitable fuels may be liquid and/or gaseous. With regard to suitable liquid fuels, these may include gasoline, kerosene, natural gas (e.g., gaseous fuel), biodiesel, or other petroleum distillates of similar density through compression ignition (and/or spark ignition, and/or other forms of ignition such as laser, plasma, or the like). Other suitable liquid fuels may not be carbon based, such as alcohols. Suitable gaseous fuels may include natural gas (methane), ethane, propane and other short chain hydrocarbons. Yet other suitable gaseous fuels may include hydrogen, ammonia, and the like. As explained further below, the engine may operate in a multi-fuel mode where two or more fuels are simultaneously combusted in engine cylinders or in a single-fuel mode where only a single fuel is combusted in the engine cylinders. In one embodiment, the single-fuel mode may be a diesel fuel mode where 100% diesel fuel is combusted at the engine cylinders. In another example, the engine may be a dual fuel engine that combusts a mixture of gaseous fuel and diesel fuel. As used herein, a substitution ratio may refer to a ratio or percentage of a secondary fuel (such as gaseous fuel) to diesel fuel combusted at the engine cylinders.

In one example, the rail vehicle is a diesel-electric vehicle. As depicted in FIG. 1, the engine is coupled to an electric power generation system, which may include an alternator/generator 122 and electric traction motors 124. In one example, the alternator/generator may include a direct current (DC) generator. For example, the engine may be a diesel and/or natural gas engine that generates a torque output that is transmitted to the electric generator which is mechanically coupled to the engine. As explained above, the engine may be a multi-fuel engine operating with diesel fuel and natural gas, but in other examples the engine may use other straight/mono fuels.

The generator produces electrical power that may be stored and applied for subsequent propagation to a variety of downstream electrical components. As an example, the generator may be electrically coupled to a plurality of traction motors and the generator may provide electrical power to the plurality of traction motors. As depicted, the plurality of traction motors may each connect to a wheel of the plurality of wheels to provide tractive power to propel the rail vehicle. One example arrangement may include one traction motor per wheel set. As depicted herein, six pairs of traction motors correspond to each of six pairs of motive wheels of the rail vehicle. In another example, alternator/generator may be coupled to one or more resistive grids 126. The resistive grids may dissipate excess engine torque via heat produced by the grids from electricity generated by the alternator/generator. In other embodiments, not shown, electrical energy storage devices may be used in place of or in addition to the resistive grids. Suitable energy storage devices may include batteries, ultracaps, and the like.

The vehicle system may include a turbocharger 120. The turbocharger may be disposed between the intake passage and the exhaust passage. In alternate embodiments, the turbocharger may be replaced with a supercharger. The turbocharger increases air charge of ambient air drawn into the intake passage in order to provide greater charge density during combustion to increase power output and/or engine-operating efficiency. As shown in FIG. 1, the turbocharger may include a compressor 121 (disposed in the intake passage) which is at least partially driven by a turbine 123 (disposed in the exhaust passage). While in this case a single turbocharger is included, the system may include multiple turbine and/or compressor stages. A temperature sensor 125 is positioned in the exhaust passage, upstream of an inlet of the turbine. In this way, the temperature sensor may measure a temperature of exhaust gases entering the turbine. As shown in FIG. 1, a wastegate 127 is disposed in a bypass passage around the turbine and may be adjusted, via actuation from controller 110, to increase or decrease exhaust gas flow through the turbine. For example, opening the wastegate (or increasing the amount of opening) may decrease exhaust flow through the turbine and correspondingly decrease the rotational speed of the compressor. As a result, less air may enter the engine, thereby decreasing the combustion air-fuel ratio.

The vehicle system also may include a compressor bypass passage 140 coupled directly to the intake passage, upstream of the compressor and upstream of the engine. In one example, the compressor bypass passage may be coupled to the intake passage, upstream of the intake manifold of the engine. The compressor bypass passage is additionally coupled to atmosphere, or exterior to the engine. In an alternate embodiment, the compressor bypass passage may be coupled to the intake passage, upstream of the compressor, and the exhaust passage, downstream of the turbine. In one embodiment, the compressor bypass passage may instead be an engine bypass passage coupled to the intake passage, downstream of the compressor (and have an engine bypass valve disposed therein) and thus divert airflow away from the engine after the airflow has passed through the compressor.

The compressor bypass passage may divert airflow (e.g., from before the compressor inlet) away from the engine (or intake manifold of the engine) and to atmosphere. In the embodiment where the passage is instead an engine bypass passage, the engine bypass passage may divert boosted airflow (e.g., from the compressor outlet) away from the engine and to atmosphere. A compressor bypass valve (CBV) 142 may be positioned in the compressor bypass passage and may include an actuator actuatable by the controller to adjust the amount of intake airflow diverted away from the engine and to atmosphere. In one example, the compressor bypass valve may be a two-position, on/off valve. In another example, the compressor bypass valve may be a continuously variable valve adjustable into a fully open position, fully closed position, and a plurality of positions between fully open and fully closed. When the compressor bypass valve is in the fully closed (or closed) position, airflow may be blocked from flowing to atmosphere via the compressor bypass passage. As a result, all of the intake airflow may travel to the compressor and then to the engine for combustion in the engine cylinders.

In some embodiments, the vehicle system may further include an aftertreatment system coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or systems.

The vehicle system shown in FIG. 1 does not include an exhaust gas recirculation (EGR) system. However, in alternate embodiments, the vehicle system may include an EGR system coupled to the engine, which routes exhaust gas from the exhaust passage of the engine to the intake passage downstream of the turbocharger. In some embodiments, the exhaust gas recirculation system may be coupled exclusively to a group of one or more donor cylinders of the engine (also referred to a donor cylinder system).

As depicted in FIG. 1, the vehicle system further may include a cooling system 150. The cooling system circulates coolant through the engine to absorb waste engine heat and distribute the heated coolant to a heat exchanger, such as a radiator 152. A fan 154 may be coupled to the radiator in order to maintain an airflow through the radiator when the vehicle is moving slowly or stopped while the engine is running. In some examples, fan speed may be controlled by the controller. Coolant which is cooled by the radiator enters a tank 156. The coolant may then be pumped by a water, or coolant, pump (not shown) back to the engine or to another component of the vehicle system.

The rail vehicle further may include the engine controller (referred to herein as the controller) to control various components related to the rail vehicle. As an example, various components of the vehicle system may be coupled to the controller via a communication channel or data bus. In one example, the controller may include a computer control system. The controller may additionally or alternatively include a memory holding non-transitory computer readable storage media (not shown) including code for enabling on-board monitoring and control of rail vehicle operation.

The controller may receive information from a plurality of sensors and may send control signals to a plurality of actuators. The controller, while overseeing control and management of the rail vehicle, may receive signals from a variety of engine sensors, as further elaborated herein, in order to determine operating parameters and operating conditions, and correspondingly adjust various engine actuators to control operation of the rail vehicle. For example, the engine controller may receive signals from various engine sensors including, but not limited to, engine speed, engine load (derived from fueling quantity commanded by the engine controller, fueling quantity indicated by measured fuel system parameters, averaged mean-torque data, and/or electric power output from the alternator or generator), mass airflow amount/rate (e.g., via a mass airflow meter), intake manifold air pressure, boost pressure, exhaust pressure, ambient pressure, ambient temperature, exhaust temperature (such as the exhaust temperature entering the turbine, as determined from the temperature sensor), particulate filter temperature, particulate filter back pressure, engine coolant pressure, exhaust oxides-of-nitrogen quantity (from NOx sensor), exhaust soot quantity (from soot/particulate matter sensor), exhaust gas oxygen level sensor, or the like. Correspondingly, the controller may control the rail vehicle by sending commands to various components such as the traction motors, the alternator/generator, cylinder valves, fuel injectors, a notch throttle, the compressor bypass valve (or an engine bypass valve in alternate embodiments), a wastegate, or the like. Other actively operating and controlling actuators may be coupled to various locations in the rail vehicle. In one example, adjusting an amount of intake airflow diverted away from the intake manifold and to atmosphere (and thus the amount of boosted intake airflow entering the engine) may include adjusting an actuator of the compressor bypass valve to adjust the amount of airflow bypassing the engine via the compressor bypass passage.

Figure 2:
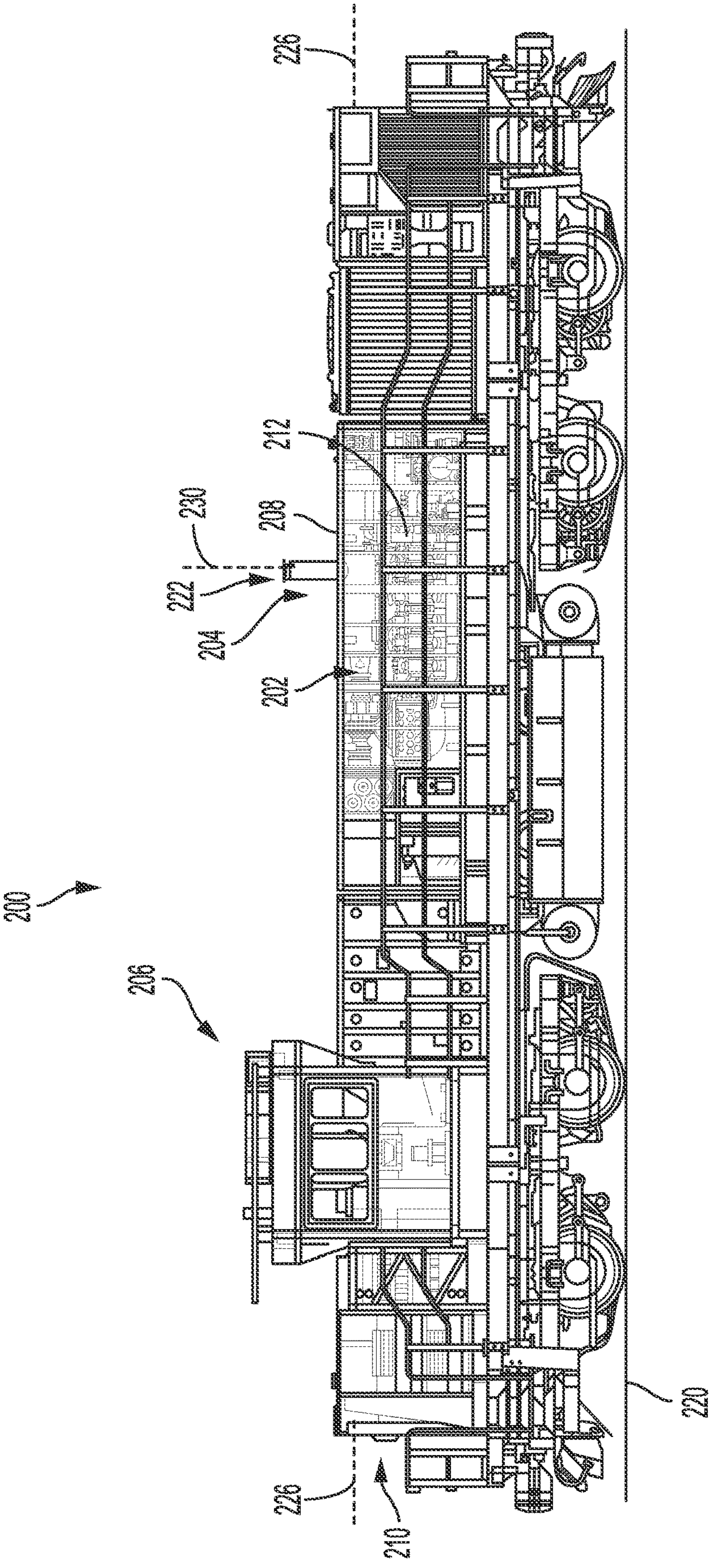
FIG. 2 shows a side view of a locomotive including a cab-mounted muffler assembly.
Figure 3:
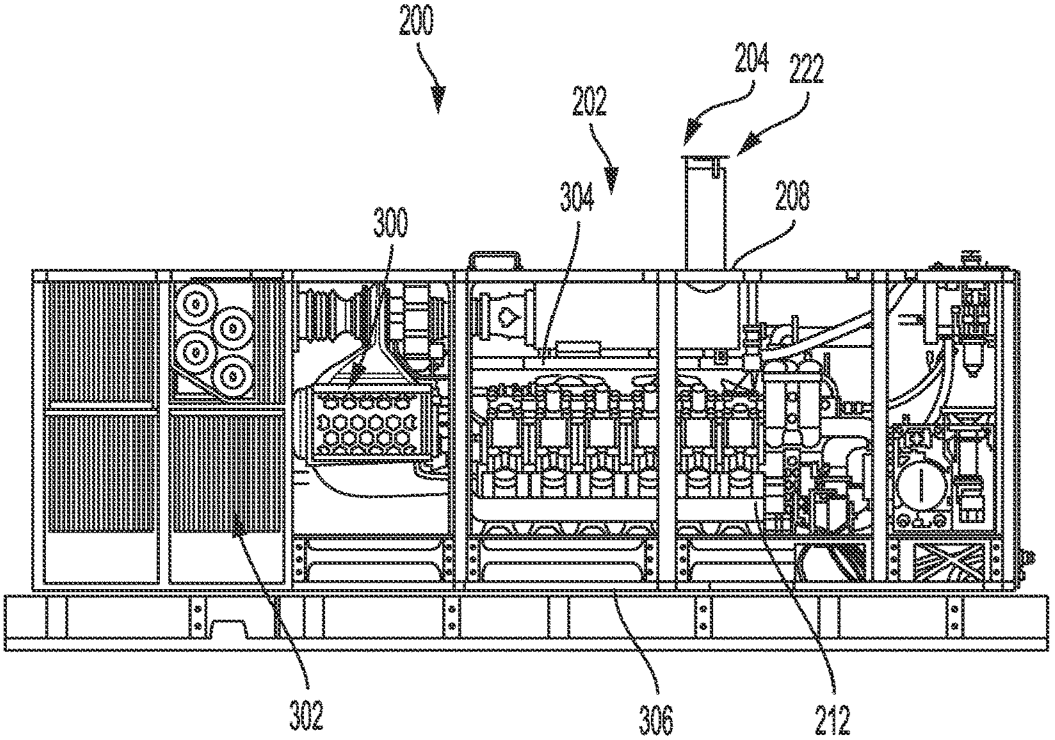
FIG. 3 shows a side view of an engine cab of the locomotive of FIG. 2.
Figure 4:
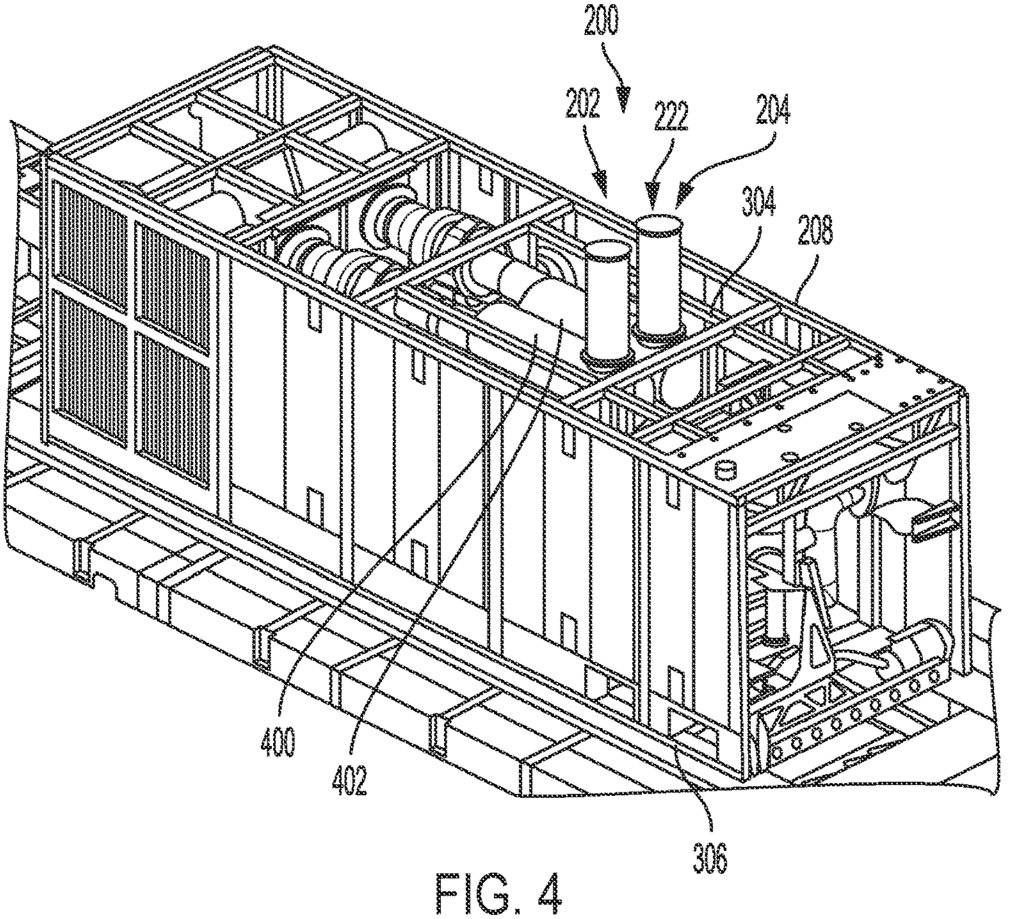
FIG. 4 shows a perspective view of the engine cab of FIG. 3.

Referring to FIGS. 2-4, a vehicle 200 including an engine system 202 with a cab-mounted muffler assembly 204 is shown. The engine system may be similar to, or the same as, the engine system described above with reference to FIG. 1. Further, the cab-mounted muffler assembly may be similar to, or the same as, the muffler described above with reference to FIG. 1. The cab-mounted muffler assembly may be referred to herein as an exhaust management system.

As shown by FIG. 2, the vehicle may include an operator cab 206 and an engine cab 208. The operator cab may be arranged toward a front end 210 of the vehicle, while the engine cab may be arranged further from the front end than the operator cab. The engine cab may house an engine 212 of the vehicle, as shown by FIG. 3. The engine may be the same as, or similar to, the engine described above with reference to FIG. 1. The engine cab may further house other components, such as an intercooler 300, alternator 302, etc. The engine cab may include a support structure 304 configured to support the cab-mounted muffler assembly in a position vertically above the engine relative to a ground surface 220 (shown by FIG. 2), such as a rail, on which the vehicle sits. The support structure may be supported entirely by the engine cab (e.g., an entire weight of the support structure may be supported by the engine cab and the support structure may be fixedly coupled to the engine cab). The support structure is shown by FIGS. 7-10 and described in further detail below.

The cab-mounted muffler assembly may seat against the support structure in the position vertically above the engine relative to a floor 306 of the engine cab, as shown by FIG. 4. The cab-mounted muffler assembly is further coupled to an exhaust stack 222 of the engine, with the exhaust stack extending vertically above the engine in a direction away from the ground surface on which the vehicle sits. Exhaust combustion gases of the engine may flow through the cab-mounted muffler assembly to the exhaust stack and may be vented to atmosphere via the exhaust stack.

Referring to FIGS. 5-6, the cab-mounted muffler assembly is shown separated from the support structure and engine system. In the embodiment shown, the cab-mounted muffler assembly may include a first muffler chamber 400 and a second muffler chamber 402 arranged parallel with each other (e.g., in a direction of horizontal axis 226). The first muffler chamber may include a first inlet 500 configured to receive engine exhaust gases from a first source (e.g., a turbine of a first turbocharger), and the second muffler chamber may include a second inlet 502 configured to receive engine exhaust gases from a second source (e.g., a turbine of a second turbocharger). However, in other embodiments, the first inlet and second inlet may each receive engine exhaust gases from a same source (e.g., a turbine of a single turbocharger, an exhaust manifold, etc.).

The first muffler chamber further may include a first outlet 504 configured to couple to a first stack passage 508 of the exhaust stack, and the second muffler chamber further may include a second outlet 506 configured to couple to a second stack passage 510 of the exhaust stack. The exhaust stack comprises the first stack passage and the second stack passage (e.g., the exhaust stack is formed by the first stack passage and the second stack passage). In the embodiment shown, the first stack passage and second stack passage each extend in a vertical direction (e.g., a direction of vertical axis 230, also shown by FIG. 2), perpendicular to each of the first muffler chamber, the second muffler chamber, and the ground surface on which the vehicle sits. In other embodiments, one or both of the first stack passage and second stack passage may curve and/or bend in other directions and/or may couple to each other, similar to the embodiment shown by FIGS. 18-20 and described further below.

The cab-mounted muffler assembly further may include mounting brackets 520 configured to engage with the support structure of the engine cab in order to mount the cab-mounted muffler assembly to the support structure. The mounting brackets may include openings (e.g., holes) adapted to receive fasteners (e.g., bolts). The openings of the mounting brackets are arranged to align with counterpart openings of the support structure such that the fasteners may extend through the openings of the mounting brackets and the counterpart openings of the support structure to couple (e.g., mount) the cab-mounted muffler assembly to the support structure.

Similar to the example described above with reference to the muffler shown by FIG. 1, the cab-mounted muffler assembly may include at least one spark arrestor. In one embodiment, the first muffler chamber may include a first spark arrestor 503 (which may be referred to herein as a first integrated spark arrestor), and the second muffler chamber may include a second spark arrestor 505 (which may be referred to herein as a second integrated spark arrestor). The first spark arrestor may be integrated with the first muffler chamber (e.g., disposed within an interior of the first muffler chamber), and the second spark arrestor may be integrated with the second muffler chamber. Because the cab-mounted muffler assembly is supported by the support structure, the support structure additionally supports the spark arrestors integrated with the muffler chambers of the cab-mounted muffler assembly. Arrangements that do not include the cab-mounted muffler assembly supported by the support structure may be unable to include the spark arrestors or may include spark arrestors coupled directly to the engine, which may result in undesired vibration of the spark arrestors and/or heat transfer to the spark arrestors.

Figure 7:
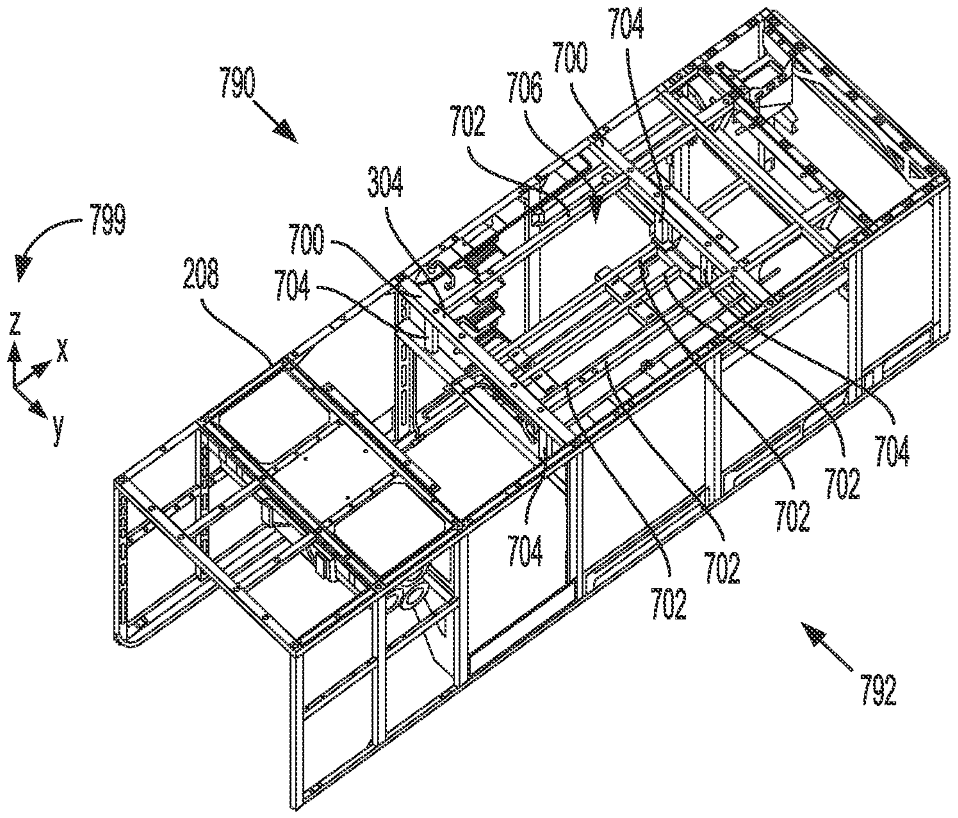
FIG. 7 shows a perspective view of a support structure of an engine cab.
Figure 8:
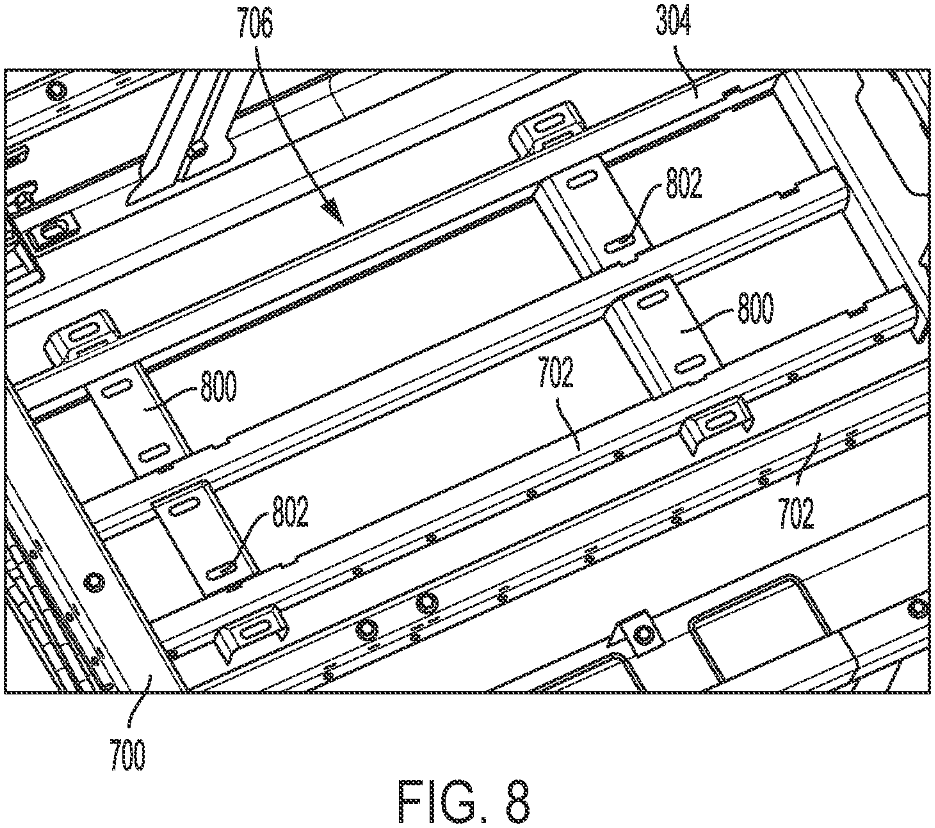
FIG. 8 shows an enlarged view of a mounting surface of the support structure of FIG. 7.

Referring to FIGS. 7-8, the support structure of the engine cab is shown with the cab-mounted muffler assembly removed from the engine cab. The support structure may include lateral support beams 700, longitudinal support beams 702, and transverse support beams 704 arranged to form an enclosure 706 (e.g., the enclosure may be defined by the beams and may be formed between the beams). The longitudinal support beams extend parallel with the x-axis of reference axes 799, the lateral support beams extend parallel with the y-axis of the reference axes, and the transverse support beams extend parallel with the z-axis of the reference axes. The x-axis of the reference axes is parallel with the horizontal axis extending parallel with the first muffler chamber and the second muffler chamber, the y-axis of the reference axes is perpendicular to the x-axis and extends in a direction from a first side 790 to an opposing, second side 792 of the engine cab (where the direction of travel of the vehicle is along the x-axis of the reference axes and the y-axis is perpendicular to the direction of travel), and the z-axis of the reference axes extends in a vertical direction relative to the ground surface on which the vehicle sits and is perpendicular to each of the x-axis and the y-axis of the reference axes. The enclosure may house the cab-mounted muffler assembly vertically above the engine of the engine system (e.g., the cab-mounted muffler assembly seats within the enclosure). As shown by FIG. 8, a plurality of brackets 800 are coupled to the longitudinal support beams and include openings 802 adapted to align with (e.g., fit against) counterpart openings of brackets of the cab-mounted muffler assembly. During conditions in which the cab-mounted muffler assembly is mounted to the support structure, the cab-mounted muffler assembly is spaced apart from the engine such that an amount of vibration of the engine imparted to the cab-mounted muffler assembly may be reduced or eliminated. Further, due to the spaced apart arrangement of the cab-mounted muffler assembly relative to the engine, an amount of heat transferred to the cab-mounted muffler assembly by the engine may be reduced. As a result, a likelihood of degradation of the cab-mounted muffler assembly may be reduced, and vibration of the engine may be more easily maintained within a determined range (e.g., 60 Hz).

Figure 9:
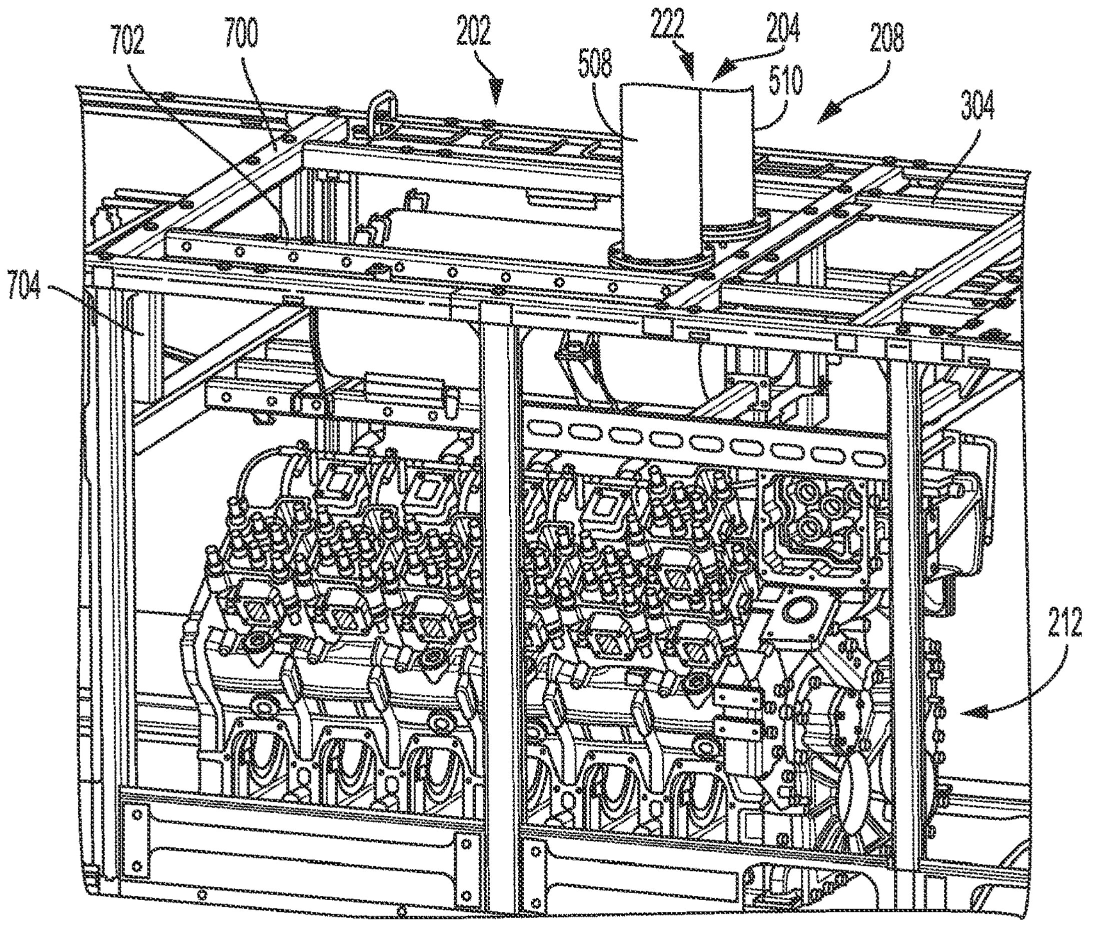
FIG. 9 shows a perspective view of the cab-mounted muffler assembly of FIGS. 5-6 mounted to the support structure of FIGS. 7-8.
Figure 10:
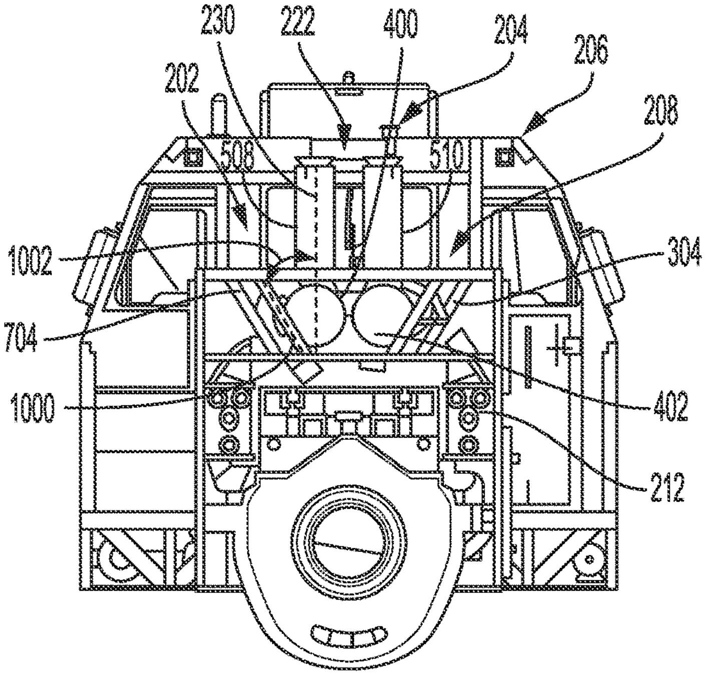
FIG. 10 shows a front view of the cab-mounted muffler assembly of FIGS. 5-6 mounted to the support structure of FIGS. 7-8.

Referring to FIGS. 9-10, the cab-mounted muffler assembly is shown coupled to the support structure. In some embodiments, at least some of the transverse support beams are arranged at an angle relative to the vertical direction, as indicated by angle 1002 between the vertical axis and axis 1000 parallel to one of the transverse support beams in FIG. 10. In this arrangement, the transverse support beams are not parallel or perpendicular to the lateral support beams or longitudinal support beams (e.g., the transverse support beams are in a non-orthogonal arrangement relative to the longitudinal support beams and lateral support beams). The angle of the traverse support beams may increase accessibility of the engine and/or cab-mounted muffler assembly for servicing and/or maintenance, as described further below with reference to FIGS. 13-15. By configuring the longitudinal support beams and lateral support beams as shown, the exhaust stack may extend vertically outward from the engine cabin with the first muffler chamber and second muffler chamber in the horizontal position, as shown by FIG. 9. This arrangement may increase a visibility of the engine cab and other portions of the vehicle to an operator within the operator cab, as described further below with reference to FIGS. 11-12. Further, this arrangement may reduce an amount of engine exhaust directed from the exhaust stack toward the operator cab, as described further below with reference to FIGS. 16-17.

Referring to FIGS. 11-12, the vehicle is partially shown with an operator 1102 in the operator cab. As indicated by dashed arrow lines 1100, the arrangement of the cab-mounted muffler assembly and exhaust stack provides increased visibility of the engine cab and other portions of the vehicle to the operator. In particular, the dashed arrow lines indicate the lines of view of the operator in the direction toward the cab-mounted muffler assembly while the operator is within the operator cab. The operator may be able to view between the first stack passage and second stack passage, as well as view to each side of the first stack passage and second stack passage. Increasing the visibility in this way may increase an ease with which the operator is able to monitor the condition of the vehicle (e.g., to identify portions of the vehicle for servicing, to view the surroundings of the vehicle, etc.).

FIGS. 13-15 show different views of the cab-mounted muffler assembly coupled to the support structure. The arrangement of the support structure and cab-mounted muffler assembly increases an amount of space around the engine for maintenance and/or servicing of components of the engine system. In particular, as shown by FIGS. 13-14, the angled arrangement of the traverse support beams of the support structure provide spaces at opposing sides of the engine for an operator to occupy during maintenance and/or servicing of the components, as shown by FIG. 15. A first space 1300 is shown at a first side 1304 of the engine, and a second space 1302 is shown at a second side 1306 of the engine. The engine may include a first plurality of cylinders (e.g., a first cylinder bank) at the first side, and a second plurality of cylinders (e.g., a second cylinder bank) at the second side. The cab-mounted muffler assembly may be supported between the opposing cylinder banks by the support structure, with the first muffler chamber and the second muffler chamber each parallel with the first cylinder bank and the second cylinder bank (e.g., the first muffler chamber extends parallel with an axis extending through each cylinder of the first cylinder bank, and the second muffler chamber extends parallel with an axis extending through each cylinder of the second cylinder bank). The first space and second space may additionally provide clearance for installation and/or removal of components from the engine system. The increased space surrounding the engine may increase ease of access to the engine, which may reduce an amount of time to service the engine and increase productivity.

Referring to FIGS. 16-17, different paths of engine exhaust gases from the exhaust stack are shown. In particular, FIG. 16 shows an exhaust path 1600 during a first operating condition of the engine, and FIG. 17 shows an exhaust path 1700 during a second operating condition of the engine. FIGS. 16-17 each include a scale 1602 indicating an engine exhaust mass fraction via stipple shading. In particular, higher engine exhaust mass fraction values (e.g., 0.015) are represented by stipple shading having a larger stipple size, and smaller engine exhaust mass fraction values (e.g., 0.001) are represented by stipple shading having a smaller stipple size. In one embodiment, the first operating condition may be operation at a first engine speed (e.g., 100 kmph), and the second operating condition may be operation at a second engine speed (e.g., 50 kmph). However, the first operating condition and/or second operating condition may be different in some embodiments. Due to the arrangement of the cab-mounted muffler assembly mounted to the support structure of the engine cab, the exhaust paths shown by FIG. 16-17 are directed away from the operator cab as shown. The flow of the engine exhaust gas away from the operator cab may increase operator visibility of the engine cab and other portions of the vehicle during conditions in which the engine is operating.

Referring to FIGS. 18-20, different views of another embodiment of a cab-mounted muffler assembly 1800 including a first angled stack passage 1802 and a second angled stack passage 1804 are shown. The cab-mounted muffler shown by FIGS. 18-20 may be the same as the cab-mounted muffler described above with reference to FIGS. 2-17 with the exception of the first angled stack passage and second angled stack passage. The first angled stack passage and second angled stack passage merge (e.g., converge) to a single joined stack passage 1806 in the embodiment shown (e.g., the first angled stack passage extends outward from the first muffler chamber along first axis 1900 and the second angled stack passage extends outward from the second muffler chamber along second axis 1902, with the first muffler chamber and second muffler chamber angling toward third axis 1904 and merging at the third axis). Exhaust gases flowing through the first angled stack passage and the second angled stack passage may mix and/or converge within the single joined stack passage prior to flowing to atmosphere. However, in some embodiments, the first angled stack passage and second angled stack passage may not converge. Configuring the first angled stack passage and second angled stack passage to converge with the joined stack passage may reduce a number of components of the exhaust stack and cab-mounted muffler assembly, which may reduce a production cost of the cab-mounted muffler assembly.

By arranging the cab-mounted muffler assembly according to the embodiments described above, the cab-mounted muffler assembly may be sized to include integrated components such as spark arrestors without applying additional weight load to the engine. Further, the arrangement of the cab-mounted muffler assembly mounted to the support structure increases usable space around the engine for maintenance and/or assembly of engine components. The vertical arrangement of the exhaust stack relative to the horizontal arrangement of the muffler chambers increases visibility of portions of the vehicle from the operator cab, which may enable the operator to more easily monitor the condition of the vehicle.

FIGS. 2-20 show example arrangements with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure also provides support for a system, comprising: a support structure configured to couple to an engine cab within an interior of the engine cab, and a muffler assembly configured to mount to the support structure within the interior and spaced apart from an engine by the support structure. In a first example of the system, the muffler assembly is mounted to the support structure vertically above the engine relative to a ground surface on which the engine cab is supported. In a second example of the system, optionally including the first example, the muffler assembly includes an exhaust stack extending from the interior to an exterior of the engine cab. In a third example of the system, optionally including one or both of the first and second examples, the exhaust stack extends perpendicular to a muffler chamber of the muffler assembly. In a fourth example of the system, optionally including one or more or each of the first through third examples, the exhaust stack extends in a vertical direction relative to a ground surface on which the engine cab is supported, and the muffler chamber extends parallel to the ground surface. In a fifth example of the system, optionally including one or more or each of the first through fourth examples, the support structure includes an enclosure formed between a plurality of support beams, with the muffler assembly seated within the enclosure. In a sixth example of the system, optionally including one or more or each of the first through fifth examples, the plurality of support beams includes a plurality of longitudinal support beams, a plurality of lateral support beams, and a plurality of transverse support beams. In a seventh example of the system, optionally including one or more or each of the first through sixth examples, each longitudinal support beam of the plurality of longitudinal support beams is arranged perpendicular to each lateral support beam of the plurality of lateral support beams, and each transverse support beam of the plurality of transverse support beams is arranged non-orthogonally to each longitudinal support beam of the plurality of longitudinal support beams and each lateral support beam of the plurality of lateral support beams. In a eighth example of the system, optionally including one or more or each of the first through seventh examples, the muffler assembly is mounted to the support structure between opposing cylinder banks of the engine. In a ninth example of the system, optionally including one or more or each of the first through eighth examples, the muffler assembly includes a first muffler chamber, a second muffler chamber, a first stack passage, and a second stack passage, with the first stack passage and the second stack passage together forming an exhaust stack. In a tenth example of the system, optionally including one or more or each of the first through ninth examples, the first muffler chamber includes a first integrated spark arrestor and the second muffler chamber includes a second integrated spark arrestor. In a eleventh example of the system, optionally including one or more or each of the first through tenth examples, the first stack passage is coupled to a first outlet of the first muffler chamber and extends perpendicular to the first muffler chamber, and the second stack passage is coupled to a second outlet of the second muffler chamber and extends perpendicular to the second muffler chamber. In a twelfth example of the system, optionally including one or more or each of the first through eleventh examples, the first stack passage is arranged parallel to the second stack passage and merges with the second stack passage downstream of the first outlet and the second outlet.

The disclosure also provides support for a vehicle engine system, comprising: a support structure configured to be supported entirely by an engine cab and arranged vertically above an engine relative to a floor of the engine cab, and a muffler assembly configured to be mounted within the support structure vertically above the engine and between opposing cylinder banks of the engine. In a first example of the system, the system further comprises: a first turbocharger coupled to an inlet of a first muffler chamber of the muffler assembly, a second turbocharger coupled to an inlet of a second muffler chamber of the muffler assembly, a first stack passage coupled to an outlet of the first muffler chamber, and a second stack passage coupled to an outlet of the second muffler chamber, where the first stack passage and the second stack passage form an exhaust stack of the engine. In a second example of the system, optionally including the first example, the first stack passage is supported by the support structure via the first muffler chamber, and the second stack passage is supported by the support structure via the second muffler chamber. In a third example of the system, optionally including one or both of the first and second examples, the first muffler chamber and the second muffler chamber each extend parallel to a first cylinder bank and a second cylinder bank of the opposing cylinder banks.

The disclosure also provides support for an exhaust management system, comprising: means for flowing exhaust gases from an engine to muffler chamber of a muffler assembly, the muffler assembly seated within an enclosure directly above the engine and the muffler chamber extending between opposing cylinder banks of the engine, and means for venting the exhaust gases from the muffler assembly to atmosphere via an exhaust stack extending perpendicular to the muffler chamber. In a first example of the system, the means for flowing the exhaust gases from the engine to the muffler chamber includes means for flowing the exhaust gases from the engine to a turbine of a turbocharger, and means for flowing the exhaust gases from the turbine to the muffler chamber. In a second example of the system, optionally including the first example, the system further comprises: means for flowing the exhaust gases through a spark arrestor integrated within an interior of the muffler chamber.

In one embodiment, a method comprises: flowing exhaust gases from an engine to muffler chamber of a muffler assembly, the muffler assembly seated within an enclosure directly above the engine and the muffler chamber extending between opposing cylinder banks of the engine; and venting the exhaust gases from the muffler assembly to atmosphere via an exhaust stack extending perpendicular to the muffler chamber. In a first example of the method, flowing exhaust gases from the engine to the muffler chamber includes flowing the exhaust gases from the engine to a turbine of a turbocharger, then flowing the exhaust gases from the turbine to the muffler chamber. A second example of the method optionally includes the first example, and further includes flowing the exhaust gases through a spark arrestor integrated within an interior of the muffler chamber.

As used herein, an element or step recited in the singular and proceeded with the word "a" or "an" should be understood as not excluding plural of said elements or steps, unless such exclusion is explicitly stated. References to "one embodiment" or "one example" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property. The terms "including" and "in which" are used as the plain-language equivalents of the respective terms "comprising" and "wherein." Moreover, the terms "first," "second," and "third," etc., are used merely as labels, and are not intended to impose numerical requirements or a particular positional order on their objects.

This written description uses examples to disclose the invention and to enable a person of ordinary skill in the relevant art to make and practice the invention, including making and using any devices or systems and performing any incorporated methods. The patentable scope of the invention is defined by the claims. Such other examples are within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be combined by one of ordinary skill in the art to construct additional embodiments and techniques in accordance with principles of this application.

The invention claimed is:

1. A system comprising:

a support structure configured to couple to an engine cab within an interior of the engine cab; and a muffler assembly configured to mount to the support structure within the interior and spaced apart from an engine by the support structure;

wherein the support structure includes an enclosure formed between a plurality of support beams, with the muffler assembly seated within the enclosure;

wherein the plurality of support beams includes a plurality of longitudinal support beams, a plurality of lateral support beams, and a plurality of transverse support beams; and wherein each longitudinal support beam of the plurality of longitudinal support beams is arranged perpendicular to each lateral support beam of the plurality of lateral support beams, and each transverse support beam of the plurality of transverse support beams is arranged non-orthogonally to each longitudinal support beam of the plurality of longitudinal support beams and each lateral support beam of the plurality of lateral support beams.

2. The system of claim 1, wherein the muffler assembly is mounted to the support structure vertically above the engine relative to a ground surface on which the engine cab is supported, wherein the muffler assembly includes an exhaust stack extending from the interior to an exterior of the engine cab, wherein the exhaust stack extends perpendicular to a muffler chamber of the muffler assembly, and wherein the muffler chamber extends parallel to the ground surface.

3. The system of claim 2, wherein the muffler assembly is mounted to the support structure between opposing cylinder banks of the engine.

4. The system of claim 3, wherein the muffler assembly includes a first muffler chamber, a second muffler chamber, a first stack passage, and a second stack passage, with the first stack passage and the second stack passage together forming an exhaust stack.

5. The system of claim 4, wherein the first stack passage is coupled to a first outlet of the first muffler chamber and extends perpendicular to the first muffler chamber, and the second stack passage is coupled to a second outlet of the second muffler chamber and extends perpendicular to the second muffler chamber.

6. The system of claim 5, wherein the first stack passage is arranged parallel to the second stack passage and merges with the second stack passage downstream of the first outlet and the second outlet.

7. A system comprising:

a support structure configured to couple to an engine cab within an interior of the engine cab; and a muffler assembly configured to mount to the support structure within the interior and spaced apart from an engine by the support structure, wherein the muffler assembly includes a first muffler chamber, a second muffler chamber, a first stack passage, and a second stack passage, with the first stack passage and the second stack passage together forming an exhaust stack.

8. The system of claim 7, wherein the first muffler chamber includes a first integrated spark arrestor and the second muffler chamber includes a second integrated spark arrestor.

9. The system of claim 7, wherein the first stack passage is coupled to a first outlet of the first muffler chamber and extends perpendicular to the first muffler chamber, and the second stack passage is coupled to a second outlet of the second muffler chamber and extends perpendicular to the second muffler chamber.

10. The system of claim 9, wherein the first stack passage is arranged parallel to the second stack passage and merges with the second stack passage downstream of the first outlet and the second outlet.

11. The system of claim 7, wherein the muffler assembly is mounted to the support structure vertically above the engine relative to a ground surface on which the engine cab is supported.

12. The system of claim 7, wherein the muffler assembly includes an exhaust stack extending from the interior to an exterior of the engine cab.

13. The system of claim 7, wherein the exhaust stack extends perpendicular to a muffler chamber of the muffler assembly.

14. The system of claim 13, wherein the exhaust stack extends in a vertical direction relative to a ground surface on which the engine cab is supported, and the muffler chamber extends parallel to the ground surface.

15. The system of claim 7, wherein the muffler assembly is mounted to the support structure between opposing cylinder banks of the engine.

16. A vehicle engine system comprising:

a support structure configured to be supported entirely by an engine cab and arranged vertically above an engine relative to a floor of the engine cab;

a muffler assembly configured to be mounted within the support structure vertically above the engine and between opposing cylinder banks of the engine; and a first turbocharger coupled to an inlet of a first muffler chamber of the muffler assembly, a second turbocharger coupled to an inlet of a second muffler chamber of the muffler assembly, a first stack passage coupled to an outlet of the first muffler chamber, and a second stack passage coupled to an outlet of the second muffler chamber, where the first stack passage and the second stack passage form an exhaust stack of the engine.

17. The vehicle engine system of claim 16, wherein the first stack passage is supported by the support structure via the first muffler chamber, and the second stack passage is supported by the support structure via the second muffler chamber.

18. The vehicle engine system of claim 16, wherein the first muffler chamber and the second muffler chamber each extend parallel to a first cylinder bank and a second cylinder bank of the opposing cylinder banks.

19. An exhaust management system comprising:

means for flowing exhaust gases from an engine to muffler chamber of a muffler assembly, the muffler assembly seated within an enclosure directly above the engine and the muffler chamber extending between opposing cylinder banks of the engine;

means for venting the exhaust gases from the muffler assembly to atmosphere via an exhaust stack extending perpendicular to the muffler chamber; and means for flowing the exhaust gases through a spark arrestor integrated within an interior of the muffler chamber.

20. The exhaust management system of claim 19, wherein the means for flowing the exhaust gases from the engine to the muffler chamber includes means for flowing the exhaust gases from the engine to a turbine of a turbocharger, and means for flowing the exhaust gases from the turbine to the muffler chamber.

* * * * *